Oct. 19, 1971     E. H. SHUFORD, JR., ET AL     3,613,260

CONFIDENCE TESTING DEVICE

Filed May 4, 1970     2 Sheets-Sheet 1

INVENTORS.
EMIR H. SHUFORD, JR.
H. EDWARD MASSENGILL, JR.

BY Morse, Altman & Oates

ATTORNEY

United States Patent Office 3,613,260
Patented Oct. 19, 1971

3,613,260
CONFIDENCE TESTING DEVICE
Emir H. Shuford, Jr., 4 Lincoln Terrace, Lexington, Mass. 02173, and Herman Edward Massengill, Jr., 107 Hemlock St., Arlington, Mass. 02174
Filed May 4, 1970, Ser. No. 34,422
Int. Cl. G09b 1/28
U.S. Cl. 35—8 R                    7 Claims

ABSTRACT OF THE DISCLOSURE

A device for answering multiple choice test questions having a plurality of superimposed, laterally slidable plates interposed between fixed top and bottom plates. Each of the slidable plates and the bottom plate is provided with a bar representing confidence level and a graduated curve representing the score associated with the confidence level. The top plate is formed with an opening which allows viewing of the bar and graduated scale on each of the underlying plates. The length of exposed bar on each of the plates represents the degree of confidence in each of several possible answers, the exposed length being specified by the position of an overlying plate with respect to the adjacent underlying plate. The score associated with the degree of confidence is presented on the graduated curve of an underlying plate at the intersection of the edge of the adjacent overlying plate and the graduated curve on the underlying plate.

BACKGROUND OF THE INVENTION (1) Field of invention

The invention relates to educational testing devices and more particularly to such a device by which an individual is able to express the degree of confidence he has in the correctness of each of several possible answers to a given question.

(2) Description of the prior art

In a multiple choice test an individual is required to select one of two or more possible answers for each question. For some questions, the individual may be certain that a particular answer is corect. For others, the individual may not be entirely certain that one answer is correct over one or more other possible answers. The present invention provides improvements in the device disclosed in our application Ser. No. 663,635 filed Aug. 28, 1967, now Pat. No. 3,513,568, issued May 26, 1970.

SUMMARY OF THE INVENTION

It is an object of the present invention to provide a confidence testing device by which an individual can express his degree of confidence in each of several possible answers to a given question and be scored accordingly. The confidence testing device is characterized by a plurality of superimposed, linearly slidable plates interposed between fixed and bottom plates. Each of the slidable plates and the bottom plate is provided with a bar and a graduated curve. The top plate is formed with first and second openings, the first opening being provided for viewing each of the bars and graduated curves, and the second opening providing accessibility to each of the slidable plates for movement thereof. The movement of selected overlying slidable plates serves to expose more or less of the bar and graduated curve of an underlying plate. The length of exposed bar on each of the plates represents the degree of confidence in an answer. The score associated with each confidence level is presented on the graduated curve of an underlying plate at the intersection of the edge of the adjacent overlying plate and the graduated curve on the underlying plate.

The invention accordingly comprises the apparatus possessing the construction, combination of elements, and arrangement of parts that are exemplified in the following detailed disclosure, the scope of which will be indicated in the appended claims.

BRIEF DESCRIPTION OF DRAWINGS

For a fuller understanding of the nature and objects of the present invention, reference should be had to the following detail description, taken in connection with the accompanying drawings, wherein.

DETAILED DESCRIPTION OF THE PREFERRED EMBODIMENT

Figure 1:
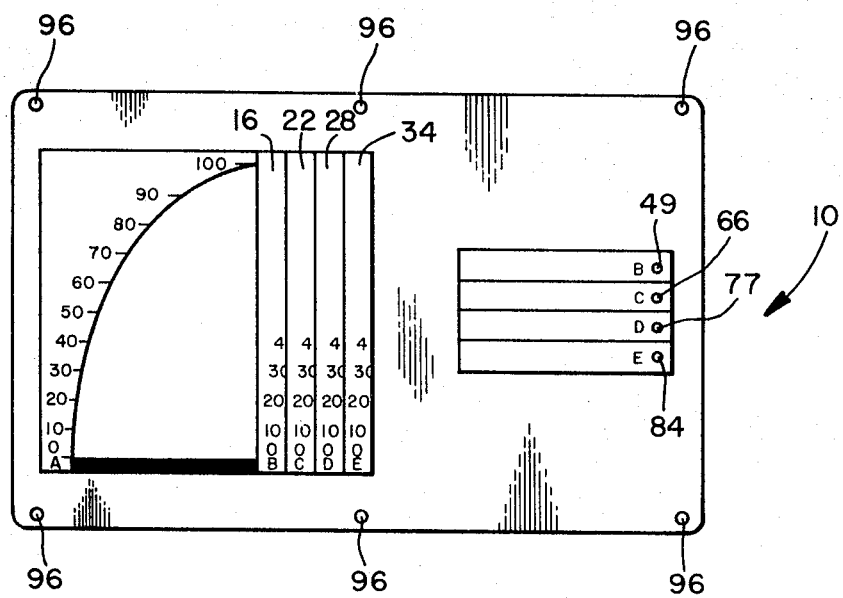
FIG. 1 is a top elevation of a confidence testing device embodying the features of the invention.

Refering now to the drawings and in particular FIG. 1, there is shown a confidence testing device 10 having, in the illustrated embodiment, a substantially rectangular profile.

Figure 3:
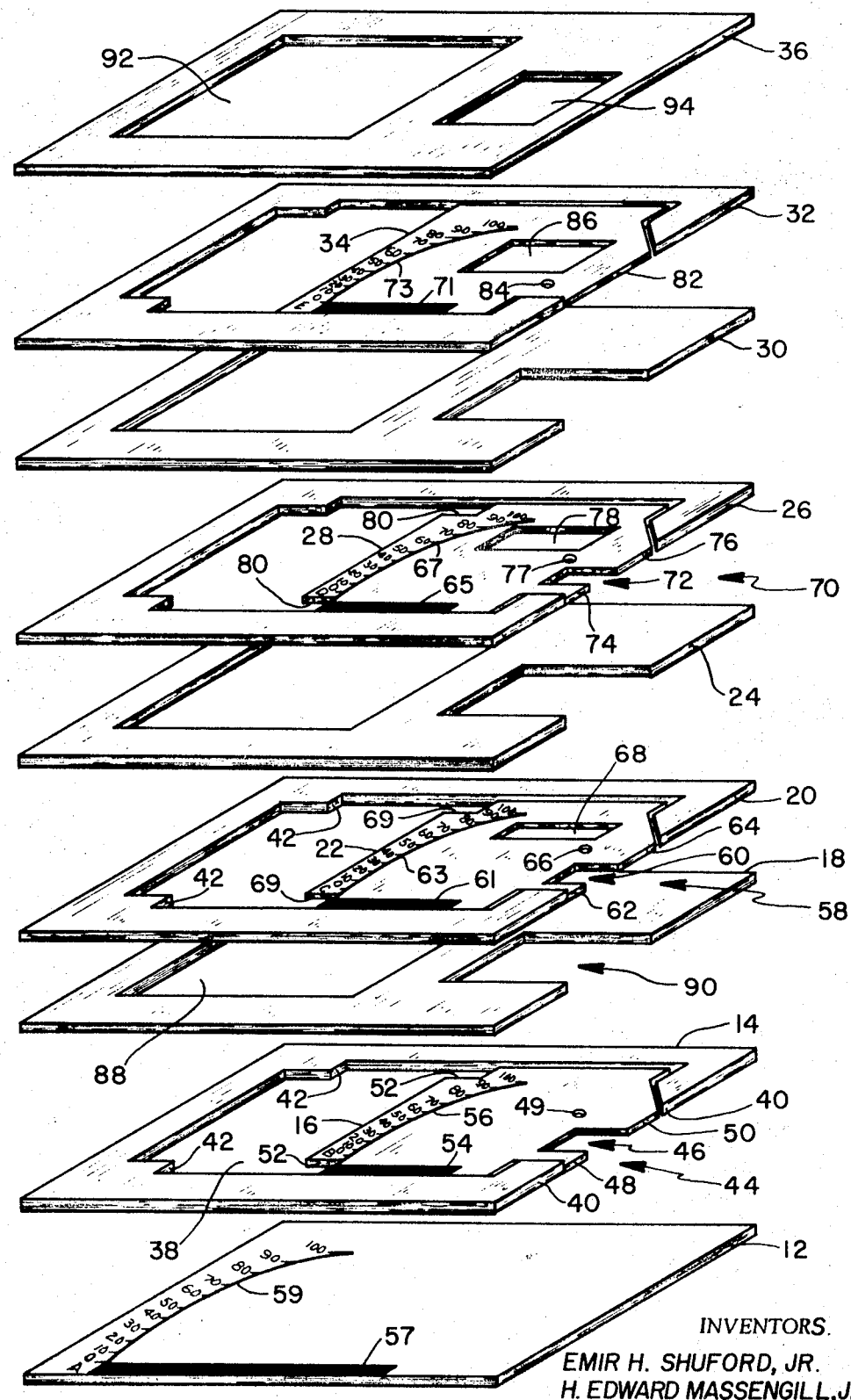
FIG. 3 is an exploded perspective of FIG. 1.

As best shown in FIG. 3, confidence testing device 10 is comprised of a plurality of superimposed plates 12, 14, 16, 18, 20, 22, 24, 26, 28, 30, 32, 34 and 36. In the illustrated embodiment, plates 12, 14, 18, 20, 24, 26, 30, 32 and 36 are fixed while plates 16, 22, 28 and 34 are slidable. While any number of fixed and slidable plates may be assembled, depending upon the number of alternatives to be considered, in practice, such alternatives usually do not exceed five which is the capacity of the illustrated embodiment. It is to be understood that the capacity may be increased or decreased by merely adding or subtracting plates.

As shown in FIG. 3, each of plates 12, 14, 18, 20, 24, 26, 30, 32 and 36 has a substantially rectangular profile, the sides of which will be referred to hereinafter as left, right, front and rear. Likewise, the sides of plates 16, 22, 28 and 34 will be referred to hereinafter as left, right, front and rear. The overall profile of plates 12, 14, 18, 20, 24, 26, 30, 32 and 36 is substantially similar while the overall profile of plates 16, 22, 28 and 34 becomes progressively smaller in one dimension. That is, in the illustrated embodiment, the left to right side dimension of plate 22 is smaller than the left to right side dimension of plate 16, the left to right side dimension of plate 28 is smaller than the left to right side dimension of plate 22 and so on. Plates 14, 20, 26 and 32 are alike and each serves as a guide for slidable plates 16, 22, 28 and 34, respectively. Plates 18, 24 and 30 are alike and each serves as a spacer between slidable plates 16, 22, 28 and 34.

Plate 14 is formed with an opening 38 which is adapted for slidable reception of plate 16. The right side of plate 14 is cutaway at 40, the sidewalls of cutaway portion 40 defining an outwardly converging taper. The front and rear left hand corners of opening 38 are each provided with a stop 42.

The right side of plate 16 is provided with a projection 44 which is slidably received within cutaway 40. The edges of projection 44 have an outwardly converging taper corresponding to the taper of the sidewalls of cutaway 40 so that the edges of projection 44 and the sidewalls of cutaway 40 are in register when engaged. Projection 44 is formed with a U-shaped opening 46, whereby projection 44 is divided into asymmetrical sections 48 and 50, section 50 being slightly larger than section 48. Section 50 is formed with a small hole 49. The left side of plate 16 is formed with L-shaped notches 52 which are engaged by stops 42 when plate 16 is slidably moved toward the left side of plate 14. Plate 16 is provided with indicia representing confidence level and score associated with the confidence level. In the preferred embodiment, the indicia representing confidence level is a stripe or bar 54 and the indicia representing score is a graduated, truncated logarithmic curve 56. As shown in FIG. 3, confidence level bar 54 is distributed along a path which is parallel to the slidable movement of plate 16. The truncated logarithmic curve is one of a family of scoring functions called admissible probability measurement procedures and which depends only upon the confidence of the student in the correct answer. Plates 12; 22, 28; and 34 are provided with indicia 57, 59; 61, 63; 65, 67; and 71, 73; respectfully. Each of indicia 57, 61, 65 and 71 corresponds to indicia 54 and each of indicia 59, 63, 67 and 73 corresponds to indicia 56.

Plate 22 is provided with a projection 58 which is formed with a U-shaped opening 60 which divides projection 58 into asymmetrical sections 62 and 64. Opening 60 is slightly smaller than opening 46, section 62 is like section 48 and section 64 is slightly larger than section 50. The edges of projection 58 have an outwardly converging taper corresponding to the tapered edges of projection 48. Section 64 is formed with a small hole 66. Plate 22 is formed with a substantially rectangular opening 68, hole 49 is in register with the longitudinal axis of opening 68. The left side of plate 22 is formed with L-shaped notches 69 which are engaged by stops 42 when plate 22 is slidably moved toward the left side of plate 20, notches 69 being slightly smaller than notches 52.

Plate 28 is provided with a projection 70 which is formed with a U-shaped opening 72 which divides projection 70 into asymmetrical sections 74 and 76. Opening 72 is slightly smaller than opening 60, section 74 is like section 62 and section 76 is slightly larger than section 64. The edges of projection 70 have outwardly converging tapers corresponding to the tapered edges of projection 48. Section 76 is formed with a small hole 77. Plate 28 is formed with a substantially rectangular opening 78, hole 66 is in register with the longitudinal axis of opening 78. The left and right sidewalls of opening 78 are slightly larger than the left and right sidewalls of opening 68, the rear sidewalls of openings 68 and 78 being in spaced relation. The left side of plate 28 is formed with L-shaped notches 80 which are engaged by stops 42 when plate 22 is slidably moved toward the left side of plate 26, notches 80 being slightly smaller than notches 69.

Plate 34 is provided with a projection 82, the edges of projection 82 having an outwardly converging taper corresponding to the tapered edges of projection 48. Projection 82 is formed with a small hole 84. Plate 32 is formed with a substantially rectangular opening 86, hole 77 is in register with the longitudinal axis of opening 86. The left and right sidewalls of opening 86 are slightly larger than the left and right sidewalls of opening 78, the rear sidewalls of openings 78 and 86 being in spaced relation. The left side of plate 34 is engaged by stops 42 when plate 34 is slidably moved toward the left side of plate 32.

Plate 18 is formed with an opening 88 at the left hand portion thereof. The right side of plate 18 is cutaway at 90, cutaway 90 being substantially U-shaped. The front, rear and left sidewalls of cutaway 90 are substantially parallel to the front, rear and left sides of plate 18, respectively. Cutaway 90 is slightly smaller than cutaway 40 and is symmetrical about the longitudinal axis of cutaway 40.

Plate 36 is formed with an opening 92, the sidewalls of which are in register with the sidewalls of opening 88. Plate 36 is formed also with an opening 94, the rear and left sidewalls of opening 94 being in spaced relation to the rear and left sidewalls of opening 90, respectively. The front sidewall of opening 94 and the front edge of section 48 are in spaced relation.

In the illustrated embodiment, the margins of each of guide plates 14, 20, 26 and 32 are bonded to the spacer plate which is spatially adjacent thereto. Plates 12, 14, 18, 20, 24, 26, 30, 32 and 36 are held in spaced relation to one another via a plurality of fasteners 96, for example rivets.

As shown in FIG. 3, in proximity with each hole 49, 66, 77 and 84 is an alphanumeric character which identifies each of slidable plates 16, 22, 28 and 34, respectively. By way of example, plates 16, 22, 28 and 34 carry the letters B, C, D and E, respectively, and plate 12 carries the letter A. The identification letter A for plate 12 is in proximity with the lower end of indicia 59. Each of plates 16, 22, 28 and 34 carry their respective identification letter in proximity with the lower end of indicia 56, 63, 67 and 73, respectively. It is to be noted that, the identification letters of each plate 12, 16, 22, 28 and 34 carried in proximity with the lower end of the correlative logarithmic curve is visible through opening 92. Each of the identification letters in proximity with each of holes 49, 66, 77 and 84 is visible through opening 94.

As best shown in FIG. 1, each of holes 49, 66, 77 and 84 is visible through opening 94. When each of plates 16, 22, 28 and 34 is in its most right hand position, holes 49, 66, 77 and 84 define a column which is in juxtaposition with the right sidewall of opening 94 and is substantially parallel thereto. When each of plates 16, 22, 28 and 34 is in its most left hand position, i.e. engaged by stops 42, holes 49, 66, 77 and 84 define a column which is in juxtaposition with the left sidewall of opening 94 and is substantially parallel thereto.

In the preferred embodiment, each of holes 49, 66, 77 and 84 is adapted for reception of a pencil, ball-point pen or other elongated implements. Each of plates 16, 22, 28 and 34 is laterally slidable by inserting the pencil into each of holes 49, 66, 77 and 84, respectively and pushing the plate in the direction desired.

In the following illustrative example, each of plates 16, 22, 28 and 34 is in its most right hand position. When the pencil is inserted into hole 49, only plate 16 is engaged thereby. However, when plate 16 is in its most right hand position and the pencil is inserted into hole 66, both plates 16 and 22 are engaged thereby, the pencil engaging the left sidewall of cutaway 46. In a similar manner, it will be appreciated that when plates 16 and 22 are in their most right hand position and the pencil is inserted in hole 77, plates 16, 22 and 28 are engaged thereby, the pencil engaging the left sidewalls of cutaways 46 and 60. In other words, the interaction of the parts of the device is so interlocked that the lengths of the confidence bar for any setting of the device always sum to a predetermined constant. It is designed also so that the left hand edge of slidable plate presents the score as a function of the degree of confidence displaced for each alternative. This is a conditional type information in that it is score which would be received if that particular alternative were given the amount of confidence displayed and if it were the correct alternative. Thus the device displays the relation between degree of confidence and score.

If an individual is using the device to allocate his confidence in a situation in which the scoring system is not relevant, he simply makes the allocation by adjusting the lengths of the confidence bars which will be constrained by the subject device so that total confidence remains a constant.

If an individual is concerned both with confidence and score, he may proceed in various ways. He may begin by allocating his confidence. This will determine the conditional scores and answer pattern. Or he may set the desired conditional score which will determine a particular confidence allocation and a given answer pattern. For the first case, if he is not satisfied with the resulting conditional scores, he may want to alter his degree of confidence setting while in the second case if he is not satisfied with the resulting confidence pattern he may want to alter his conditional scores. A combination of these two procedures may be also employed.

Once the individual is satisfied with the setting in terms of confidence or score, he can then record the conditional scores on an answer card or sheet which can be machine scored or onto an answer sheet which may be hand scored. It is to be understood that, in alternative embodiments, the settings are recorded by electronic or mechanical sensors.

Figure 2:
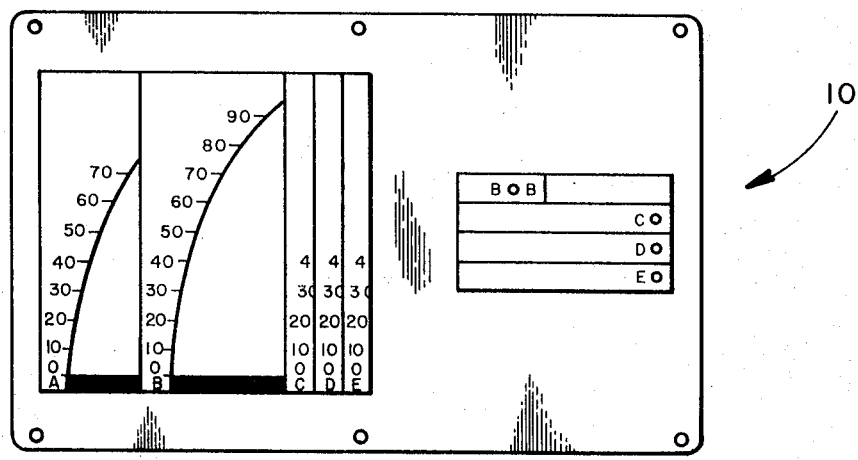
FIG. 2 is a view similar to FIG. 1 but showing the device at a different setting.

Movement of plate 16 which bears the letter B will either increase or decrease the exposed portion of bar 57 (confidence level) and logarithmic curve 59 (score function). Movement of plate 22 which bears the letter C will either increase or decrease the exposed portion of bar 54 (confidence level) and logarithmic curve 56 (score function). It will be readily appreciated that by selectively positioning each of movable plates 16, 22, 28 and 34, a student is able to indicate the degree of confidence he has in each of several possible answers to a given question. The intersection of the logarithmic curve on an underlying plate and the left hand edge of the adjacent overlying plate is the score associated with the degree of confidence By way of example, reference is now made to the FIG. 2. As previously stated, the degree of confidence is represented by the length of exposed bar. In the illustrated example, it will be seen that the exposed length of bar 54 is twice the exposed length of bar 57; bars 61, 65 and 71 are not exposed. These selected positions indicate that the student has twice as much confidence that answer B is correct than he has in answer A and that he has no confidence in answers C, D, and E. The scores associated with the foregoing degree of confidence are seventy-seven for answer A and ninety-five for answer B. The score for each of answers C, D and E is zero.

Since certain changes may be made in the foregoing disclosure without departing from the scope of the invention herein involved, it is intended that all matter contained in the foregoing description and depicted in the accompanying drawings be construed in an illustrative and not in a limiting sense.

What is claimed is:

1. A confidence testing device for indicating the degree of confidence in the correctness of one or more alternative answers to a given question and the score associated therewith, said device comprising:
   (a) a relatively fixed base;
   (b) at least two superimposed plates in parallel spaced relation to said base, each of said members adapted for linear slidable movement with respect to said base;
   (c) each of said plates and said base having indicia representing confidence level and a graphical curve representing the score associated therewith; said confidence level indicia being distributed along a path which is parallel to the path of slidable movement of each of said plates;
   (d) the degree of confidence in the correctness of an answer being indicated by the exposed length of said confidence level indicia on an underlying plate, said exposed length being specified by the position of an adjacent overlying plate with respect to said underlying plate, the score associated with said degree of confidence being indicated at the intersection of said adjacent overlying plate and said graphical curve on said underlying plate.

2. The device as claimed in claim 1 wherein said plates have a substantially rectangular profile.

3. The device as claimed in claim 1 wherein said device includes:
   (a) guide means mounted about each of said slidable plates; and
   (b) spacer means mounted between each of said slidable plates.

4. The device as claimed in claim 3 wherein each of said plates and each of said guide means includes interlock means to permit limited relative movement between said plates.

5. The device as claimed in claim 4 wherein each of said movable plates includes a projection.

6. The device as claimed in claim 5 wherein each of said guide means is formed with an opening at one side thereof, the sidewalls of said opening defining an outwardly converging taper, the edges of each of said projections having an outwardly converging taper, the sidewalls of said opening being in register with the edges of said projection when said projection is slidably received by said opening.

7. The device as claimed in claim 5 wherein each of said projections is formed with a hole adapted for reception of an elongated instrument.

References Cited

UNITED STATES PATENTS

| 2,382,007 | 8/1945 | Frick | 35—75 X |
| 3,341,117 | 9/1967 | Painter | 35—34 X |
| 3,513,568 | 5/1970 | Shuford, Jr., et al. | 35—8 |

WILLIAM H. GRIEB, Primary Examiner

U.S. Cl. X.R.

35—75